United States Patent [19]

Cain, Jr. et al.

[11] Patent Number: 4,563,830
[45] Date of Patent: Jan. 14, 1986

[54] PROCESS AND APPARATUS FOR HARVESTING SOFT SHELL CRAYFISH

[75] Inventors: C. Dean Cain, Jr., Baton Rouge; Ronnie A. Bean, Maringouin, both of La.

[73] Assignee: Tommy French, Baton Rouge, La.; a part interest

[21] Appl. No.: 492,627

[22] Filed: May 9, 1983

[51] Int. Cl.⁴ .................................. A01K 80/00
[52] U.S. Cl. ...................... 43/4.5; 43/17.1; 43/6.5
[58] Field of Search .............. 43/9, 17.1, 6.5, 4.5; 119/3, 2; 37/119, 55; 56/8, 9

[56] References Cited

U.S. PATENT DOCUMENTS

| | | | |
|---|---|---|---|
| 1,690,440 | 2/1927 | Baker | 43/9 |
| 2,414,055 | 2/1944 | Miller | 43/9 |
| 3,415,001 | 12/1968 | Ott | 43/9 |
| 3,491,474 | 1/1970 | Metcalf | 43/17.1 |
| 3,651,595 | 3/1972 | Newman | 43/9 |
| 3,706,185 | 12/1972 | Chaplin | 56/9 |
| 3,714,729 | 2/1973 | Moise | 43/4.5 |
| 3,775,891 | 12/1973 | Holt | 43/9 |
| 3,777,388 | 12/1973 | Newman | 43/17.1 |

Primary Examiner—Nicholas P. Godici
Assistant Examiner—C. McKee
Attorney, Agent, or Firm—William D. Kiesel

[57] ABSTRACT

A process and apparatus for harvesting soft shell crayfish wherein a predetermined pulsating electrical field is established in front of a moving conveyor assembly having a pulse rate which allows the tail of the crayfish to contract in synchronization with the pulse rate causing the crayfish, in most cases, to move toward and be captured by a moving trawl assembly having a conveyor assembly which transports the crayfish to an area to be sorted and stored for shipping.

10 Claims, 3 Drawing Figures

PROCESS AND APPARATUS FOR HARVESTING SOFT SHELL CRAYFISH

BACKGROUND OF THE INVENTION

1. Field of the Invention

This invention relates to processes and apparati for harvesting crustaceans and, particularly, soft shell crustaceans such as crayfish.

2. Prior Art

In the the past, crayfish have been harvested principally in the swamps and marshes of coastal regions by the use of baited traps. However, as demand has grown, commercial "farms" for the growing of crayfish have developed. Until recently, the harvesting of these farms was done by the conventional baited traps. However, the baited traps have several disadvantages which have slowed the successful commercial development of these "farms".

Because of the size of the commercial farm ponds, many traps are required to harvest the crayfish; thus, the yield per acre have made many "farms" unprofitable. This has led to extensive research for better baits and other means of harvesting. One such means has been experimental mechanical devices which, much like grain combines, attempt to scoop up the crayfish as the devices move across the field. These devices have also been plagued by problems inherent in the nature of what crayfish ponds must be like, i.e., vegetation, such as rice and algae growing throughout, as well as the shallow depth of the pond.

Another problem is the fact that crayfish tunnel underground to build their homes, and if there are logs or stones in the pond, the crayfish have a tendency to build next to such obstacles or in the vegetation in the pond. This, in turn, has created problems for mechanical harvesters.

Soft shell crayfish pose an even greater problem since they rarely stray far or for long from their home or they stay in the pond vegetation as they are very vulnerable to predators until their shells harden. However, it has long been recognized that if they could be harvested, they would be an immediate commercial success since the entire crayfish could be eaten rather than just the tail meat which comprises only ten to fifteen percent of the body weight.

For all of the above reasons, harvesting of soft shell crayfish in sufficient numbers has been impossible until this invention.

SUMMARY OF THE INVENTION

Therefore, it is an object of this invention to provide a process and apparatus for improved harvesting of crayfish, particularly, soft shell crayfish.

Another object of this invention is to provide an apparatus that can successfully operate to harvest crayfish, particularly soft shell crayfish, in commercial ponds.

Still another object of this invention is to provide an apparatus which allows for rapid, manual separation of soft shell crayfish from hard shell crayfish after their capture.

Other objects and advantages of this invention shall become apparent from the ensuing descriptions of this invention.

Accordingly, a process for harvesting crayfish is disclosed comprising, applying in a local area, a pulsating electric current of sufficient strength to cause crayfish to move but of insufficient strength to kill the crayfish and having a pulse rate which allows the tail of the crayfish to contract in synchronization with the pulse rate, catching the moving crayfish, conveying rapidly the crayfish to a sorting area, and sorting the crayfish as desired. In another embodiment of this invention, means are provided for harvesting crayfish comprising a trawl assembly having conveyor assembly and being pivotly mounted to a vehicle for moving the trawl assembly, and a variable electrical current supply electrically connected to electrodes the ends of which are positioned in front of the trawl assembly to establish the desired pulsating electric current.

PREFERRED EMBODIMENTS OF THE INVENTION

Referring now to the Figures, there is shown a preferred crayfish harvester of this invention comprising a trawl assembly 1 pivotly mounted to the front end of a marsh buggy 2 or similar water vehicle and a variable electric current supply, such as a variable voltage pulsator 3, electrically connected to spaced apart electrodes 4 (positive anodes) attached to trawl assembly 1 (negative anode) and positioned in front thereof as shown.

Figure 1:
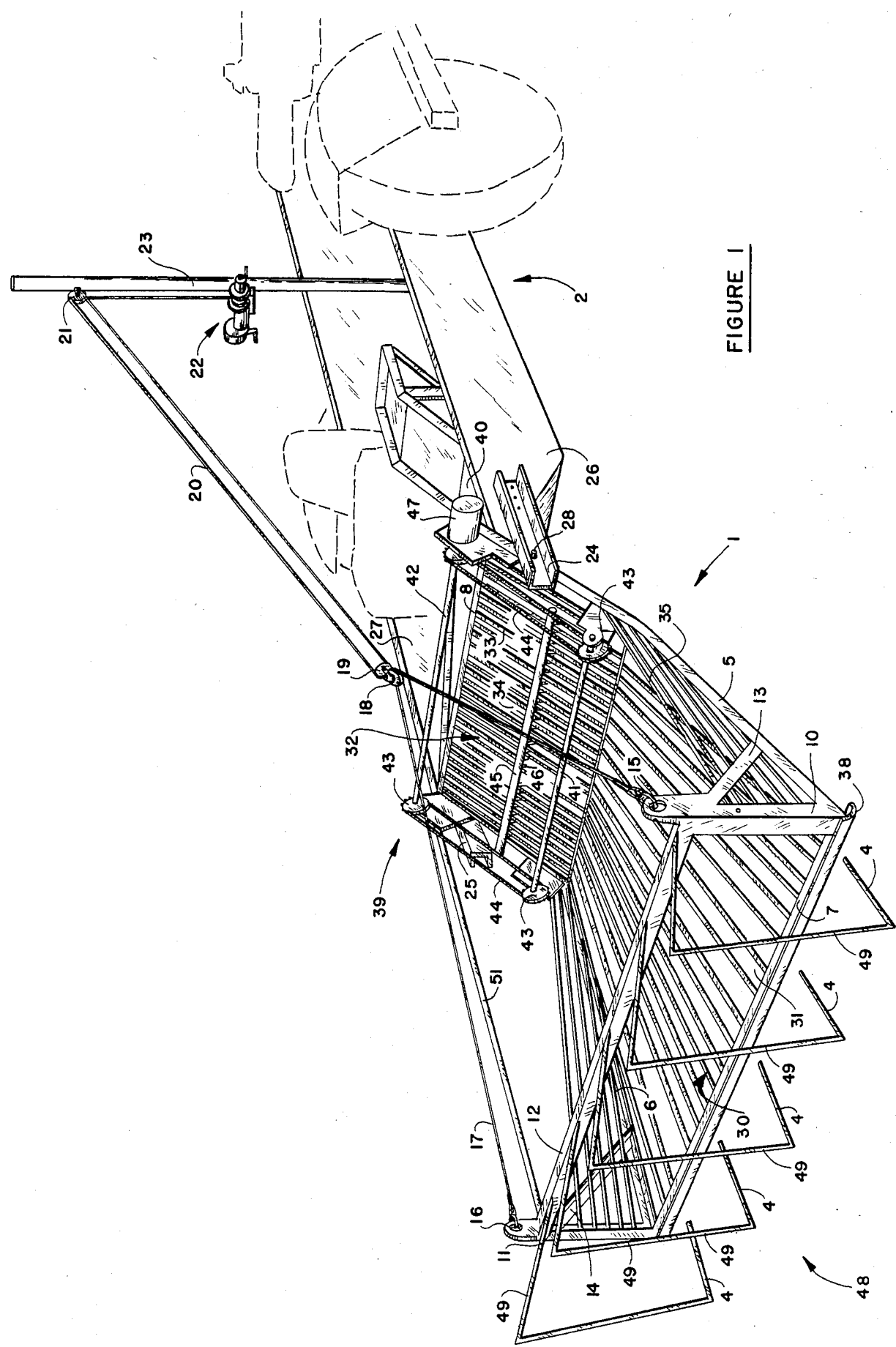
FIG. 1 is a three dimensional view of a preferred embodiment of a crayfish harvester of this invention.
Figure 2:
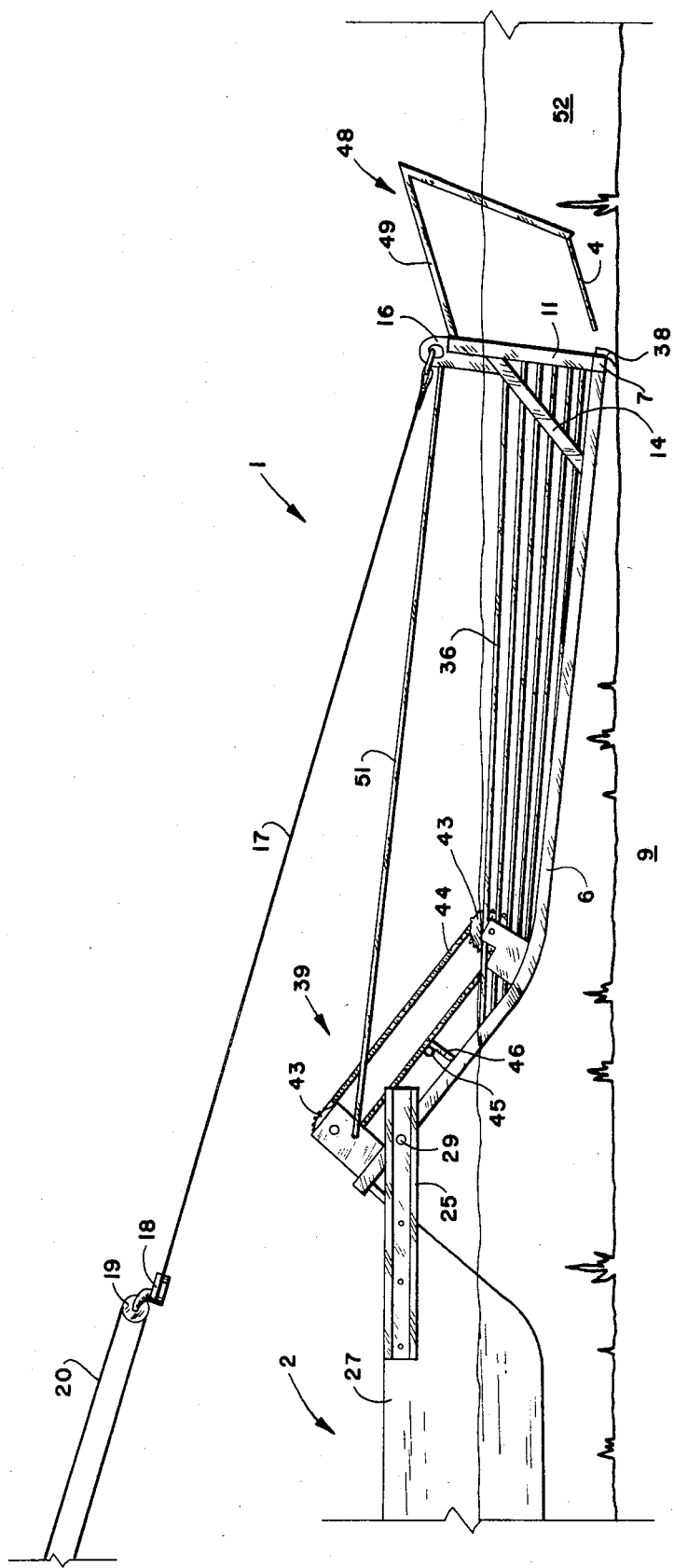
FIG. 2 is a side view of the crayfish harvester.
Figure 3:
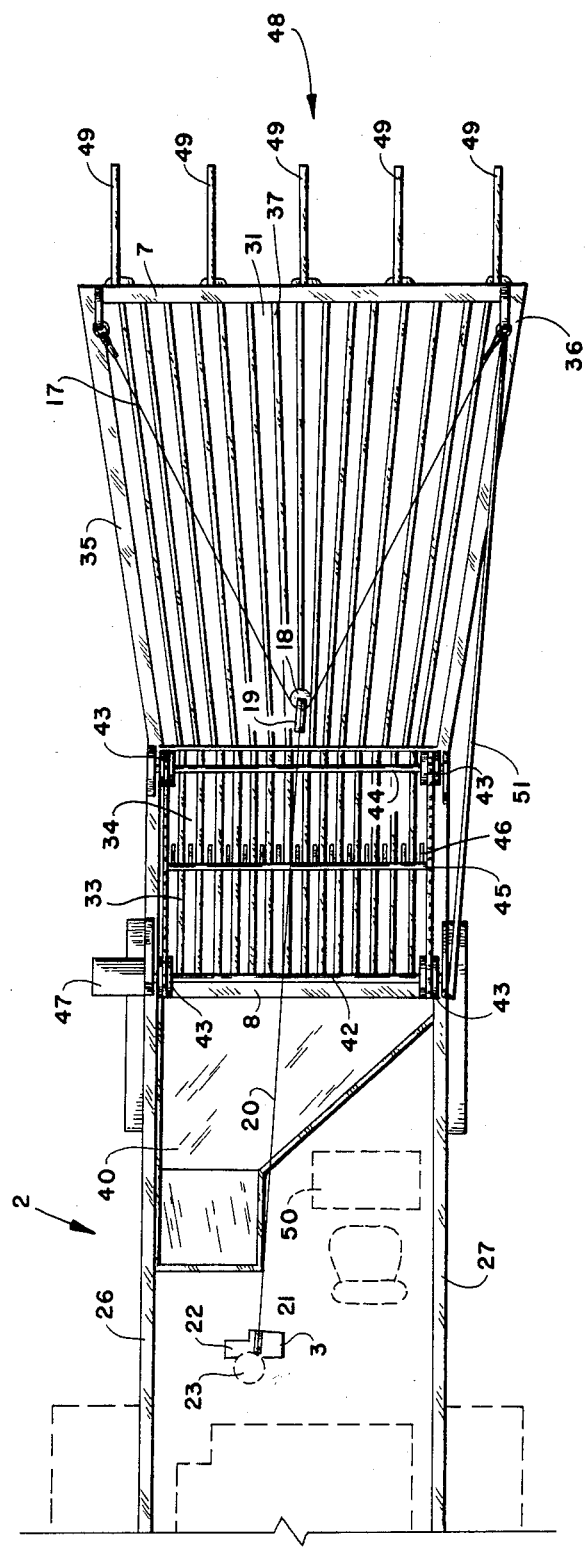
FIG. 3 is a top view of the crayfish harvester.

The trawl assembly 1 is constructed having a frame assembly comprising side square stock members 5 and 6 that are fixed in position relative to one another by front and rear channel iron members 7 and 8, respectively. In a preferred embodiment, members 5 and 6 are bent upward as shown in FIG. 2 to better position trawl assembly 1 to the water bottom 9.

The frame assembly is also provided with vertical posts 10 and 11 rigidly supported in position at the front end of members 5 and 6 by cross bar 12 and side braces 13 and 14. Eyelets 15 and 16 are provided at the top of each post 10 and 11, respectively, to which the opposite ends of cable 17 attach as shown. Cable 17 in turn passes through roller 18 of pulley 19, through which a second cable 20 passes and is operatively attached to a second pulley 21 and winch 22 fixedly positioned to ginny pole 23 vertically mounted on marsh buggy 2.

To attach the frame assembly to marsh buggy 2, channel iron members 24 and 25 are bolted to the sides 26 and 27, respectively, of the buggy 2 so that one of their ends protrudes in front of the buggy whereby side square stock members 5 and 6 can be pivotly attached by pins 28 and 29 as shown. Thus, when cable 20 in winched, frame posts 15 and 16 can be pulled up or let down as desired.

The bed or floor of the frame assembly comprises, in a preferred embodiment, a front section 30 constructed from aluminum or alloy tubing 37 and a rear section 32 also constructed from aluminum or alloy tubing material having separated tubes 33 which form vertical channels 34 to help direct movement of crayfish up section 32. Both sections 30 and 32 extend between side members 5 and 6. In a preferred embodiment, side tubing panels 35 and 36 are attached to side members 5 and 6 and posts 10 and 11 to prevent crayfish that are caught from escaping from the sides of the frame structure. In another preferred embodiment, small gaps 31 are formed between tubing 37 to allow young crayfish to escape so they can grow to maturity.

In another preferred embodiment, a rigid skid member 38 is attached to front channel iron member 7 and extends downward to curl under member 7 to act as a cushion and guide over obstacles that may be on the water bottom.

A conveyor assembly 39 is provided to move the crayfish up trawl rear section 32 and onto a sorting table 40 located in buggy 2. Assembly 39 comprises parallel axles 41 and 42 operatively connected together by sprocket 43 mounted to the frame assembly at the lower and upper ends of rear section 32 and chains 44 attached to the sprockets 43 as shown. Attached to and between chains 44 is a rake device 45 having tines 46 that can extend downward and into channels 34 as device 45 is carried in the loop formed by chains 44. Although only one rake device is illustrated, more than one can be attached to chains 44 if desired. To drive axle 42 and rotate sprockets 43 is electric motor 47.

An electrode boom assembly 48 is provided with a series of hollow bent tubing 49 attached to cross bar 12 and from which electrodes 4 extend to be positioned in front of front channel iron member 7. A power supply, such as an electrical generator 50, is used to generate the electrical current that passes through a variable voltage pulsator 3, then through wires located in conduit pipe 51 and through pipes 49 to electrodes 4.

In operation, the marsh buggy 2 with trawl assembly 1 in a raised position is driven into water 52. Trawl assembly 1 is then lowered by winch 22 until skid member 38 is resting just above the water bottom 9. Electric current from generator 50 is provided to electrodes 4 in a controlled pulsing manner and of sufficient strength to cause the tails of the crayfish to contract in synchronization with the electric pulse rate. The buggy 2 is then moved systematically across the crayfish pond.

The required pulse rate and electric field established around the electrode can vary depending on the water temperature, water mineral and salinity content. However, it is has been found that a field strength between $0.05$–$0.30$ ma/cm$^2$, and a pulse rate between 2–10 times/sec wherein each pulse is 10–200 msec is preferred in providing the desired movement of the crayfish. With this field and pulse rate, it is preferred that buggy 2 travel at a speed of 2–5 ft/sec. Within these preferred perimeters, the crayfish will involuntarily move as a result of the pulsed contraction of its tail. This will cause many crayfish in front of the buggy 2 to move directly onto parallel tubing 31 of the moving trawl. Water force then causes the crayfish to continue to move toward trawl rear section 32 until rake tines 46 push the crayfish up tubing 33 to sorting table 40 where the soft shell crayfish are immediately separated from the hard shell crayfish.

There are, of course, many alternate embodiments of this invention not specifically illustrated but which are intended to be included within the scope of this invention as defined by the following claims.

What I claim is:

1. A process for harvesting from a water body crayfish which comprises:
    (a) applying in a portion of the water body a pulsating electric current of sufficient current density to cause the crayfish to move toward a moving trawl assembly and having a pulse rate that allows the tail of the crayfish to contract in synchronization with the pulse rate;
    (b) moving the location of the current at a speed greater than the speed of the crayfish;
    (c) catching the moving crayfish by said moving trawl assembly;
    (d) conveying the caught crayfish to a sorting area; and
    (e) sorting the crayfish as desired; said electric current being pulsed 2–10 times/sec., having a pulse duration of 10–200 msec. and creating a pulsed electric field with a current density of $0.05$–$0.30$ ma/cm$^2$.

2. A process according to claim 1 wherein the trawl assembly is moved at a speed of 2–5 ft/sec.

3. A process according to claim 1 wherein the soft shell crayfish are sorted from the hard shell crayfish.

4. An apparatus for harvesting crayfish from a pond comprising;
    (a) a trawl assembly having means for catching moving crayfish and having a conveyor assembly to receive the crayfish from the means and to convey them to a sorting table;
    (b) a variable electric current supply electrically connected to electrodes attached to the trawl assembly, the electrodes having their ends positioned in front of the trawl assembly to establish the desired pulsating electric current and current density to attract the crayfish toward the trawl; and
    (c) vehicular means to move the trawl assembly; said electric current supply having means to provide the electrodes with an electric current pulsed 2–10 times/sec., having a 10–200 m sec, pulse duration, and of being of sufficient magnitude to create a pulsed electric field having a current density of $0.05$–$0.30$ ma/cm$^2$.

5. An apparatus according to claim 4 wherein the trawl assembly comprises:
    (a) a flat surface member constructed from parallel tubing and having spaced apart tubular side walls, and having an upward extending conveyor bottom pivotly attached to the vehicular means;
    (b) scooping means attached to the conveyor bottom end having conveyor means for carrying the crayfish up the conveyor bottom to the vehicular means; and
    (c) electrode boom assembly attached to the vehicular means having an arm extending in front of the flat surface member to which is attached the electrodes.

6. An apparatus according to claim 5 wherein the scooping means comprises a row of finger members attached to a rod extending across the conveyor bottom, the rod being attached to a chain and sprocket assembly that travels up conveyor bottom, the fingers extending out from the rod to a position adjacent the conveyor bottom during the rods travel up the conveyor bottom.

7. An apparatus according to claim 5 wherein the lower portion of the conveyor bottom is provided with vertically extending sidewalls.

8. An apparatus according to claim 5 wherein a pond bottom skid member is attached at one end to the front end of the flat surface member and has its opposite end protruding downward to contact the bottom of the pond.

9. An apparatus according to claim 4 wherein the vehicular means comprises:
    (a) an enclosed body structure;

(b) a wheel and axle assembly attached to the body structure; and
(c) a motor attached to the wheel and axle assembly to cause same to turn the wheels.
10. An apparatus according to claim 9 wherein the enclosed body structure has a crayfish holding chamber positioned to receive crayfish from the conveyor assembly.

* * * * *